United States Patent
Kochar et al.

(10) Patent No.: US 9,979,799 B2
(45) Date of Patent: May 22, 2018

(54) IMPERSONATING A SPECIFIC PHYSICAL HARDWARE CONFIGURATION ON A STANDARD SERVER

(71) Applicant: Lenovo Enterprise Solutions (Singapore) Pte. Ltd., Singapore (SG)

(72) Inventors: Sumeet Kochar, Cary, NC (US); Gregory B. Pruett, Raleigh, NC (US); Robert R. Wolford, Strongsville, OH (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 182 days.

(21) Appl. No.: 14/697,132

(22) Filed: Apr. 27, 2015

(65) Prior Publication Data
US 2016/0316043 A1 Oct. 27, 2016

(51) Int. Cl.
G06F 15/16 (2006.01)
H04L 29/06 (2006.01)
H04L 12/24 (2006.01)
H04L 29/08 (2006.01)

(52) U.S. Cl.
CPC ............ *H04L 67/42* (2013.01); *H04L 41/082* (2013.01); *H04L 67/20* (2013.01); *H04L 67/30* (2013.01)

(58) Field of Classification Search
CPC .............................. H04L 67/42; H04L 41/082
USPC ........................................................ 709/203
See application file for complete search history.

(56) References Cited

U.S. PATENT DOCUMENTS

| 6,289,378 | B1 * | 9/2001 | Meyer ..................... G06F 21/31 709/202 |
| 6,671,802 | B1 * | 12/2003 | Ott ....................... G06F 9/44505 713/100 |
| 7,249,179 | B1 * | 7/2007 | Romero ................ G06F 9/5083 709/221 |
| 7,987,353 | B2 * | 7/2011 | Holdaway ........... G06F 9/44505 713/1 |
| 8,417,774 | B2 * | 4/2013 | Flynn .................... G06F 3/0613 709/204 |
| 9,128,729 | B1 * | 9/2015 | Hung ..................... G06F 9/4403 |
| 2003/0229685 | A1 * | 12/2003 | Twidale .................... G06F 9/46 709/220 |
| 2005/0204125 | A1 * | 9/2005 | Chin ..................... G06F 9/4411 713/100 |

(Continued)

*Primary Examiner* — Vivek Srivastava
*Assistant Examiner* — Atta Khan
(74) *Attorney, Agent, or Firm* — Jeffrey L. Streets

(57) ABSTRACT

A method includes running servers to provide computer services to client devices and storing a hardware profile for each of a plurality of server models, wherein each hardware profile identifies hardware components that should be enabled to implement the server model on one of the servers. A request is received from a client device to provide computer services on one or more of the servers using a selected server model and applying the hardware profile for the selected server model to configure the hardware components of the one or more of the servers to use the identified hardware components without manually reconfiguring the one or more of the servers. Still further, the method includes providing computer services to the client device using the one or more of the servers that has been configured using the hardware profile for the selected server model.

10 Claims, 5 Drawing Sheets

(56) References Cited

U.S. PATENT DOCUMENTS

| | | | |
|---|---|---|---|
| 2011/0225274 A1* | 9/2011 | Dvorkin | G06F 9/445 709/222 |
| 2011/0271123 A1* | 11/2011 | Hu | G06F 1/26 713/300 |
| 2012/0084408 A1* | 4/2012 | Ayanam | H04L 41/0803 709/220 |
| 2013/0080754 A1* | 3/2013 | Ganesh | G06F 9/4403 713/2 |
| 2013/0205063 A1* | 8/2013 | Zhang | G06F 11/1415 711/102 |
| 2013/0262642 A1* | 10/2013 | Kutch | H04L 67/125 709/223 |
| 2014/0047226 A1* | 2/2014 | Dasari | G06F 1/266 713/1 |
| 2014/0075420 A1* | 3/2014 | Queru | G06F 9/4411 717/134 |
| 2014/0095854 A1* | 4/2014 | Chen | G06F 9/4403 713/1 |
| 2014/0344431 A1* | 11/2014 | Hsu | H04L 41/044 709/223 |
| 2015/0304233 A1* | 10/2015 | Krishnamurthy | H04L 47/762 709/226 |

* cited by examiner

346

Server Configuration Data

| Server Model | Hardware Profile | Firmware Code |
|---|---|---|
| A | 2 CPU's, 4 DIMM, Network Adapter | |
| B | 4 CPU's @ 4 GHz, 8 DIMM | |
| C | 1 CPU @ 2 GHz, 2 DIMM | |
| D | 2 CPU's @ 4 GHz, 8 DIMM, Network Adapter @ 100 Gb | |

FIG. 4

IMPERSONATING A SPECIFIC PHYSICAL HARDWARE CONFIGURATION ON A STANDARD SERVER

BACKGROUND OF THE INVENTION

Field of the Invention

The present invention relates to the hardware configuration of a server.

Background of the Related Art

A server may be manually configured to include a variety of hardware devices that give the server additional capability or performance. For example, additional or higher capacity memory modules, such as dual inline memory modules (DIMMs), may be inserted into a memory slot on a motherboard of the server. Input and output devices may also be provided or facilitated by installing an expansion card into another slot on the motherboard, such as a peripheral connect interface (PCI) slot. Even additional central processing units (CPUs) may be installed if the motherboard has the additional sockets.

Some devices can be manually hot plugged into a server without shutting down the server. Such devices may include external devices that are connected through a Universal Serial Bus (USB) port. However, many of the hardware devices of a server can only be manually added or removed from a server while the server is powered off. For example, physically removing a memory module or CPU while the server is running may lead to loss of data, the occurrence of numerous errors, and the like. Still, it should be recognized that each of these hardware devices is added or removed through physical handling of the hardware device or its connection.

It is desirable for a server to be populated with sufficient hardware components, such as CPUs and memory modules, in order to perform a given task or workload. However, a server with more than the required hardware components will not use power efficiently, since the un-utilized hardware components will still be consuming power. Still further, it may not be practical in any given system to have servers with many different hardware configurations just for the purpose of matching a server with a given task.

BRIEF SUMMARY OF THE INVENTION

One embodiment of the present invention provides a method, comprising running a plurality of servers to provide computer services to a plurality of client devices and storing a hardware profile for each of a plurality of server models, wherein the hardware profile for each server model identifies a subset of the hardware components of any one of the servers that should be enabled to implement the server model. The method further comprises receiving a request from a client device to provide computer services to the client device on one or more of the servers using a selected one of the server models and applying the hardware profile for the selected server model to configure the hardware components of the one or more of the servers to use the identified subset of the hardware components without manually reconfiguring the hardware components of the one or more of the servers. Still further, the method comprises providing computer services to the client device using the one or more of the servers that has been configured using the hardware profile for the selected server model.

Another embodiment of the present invention provides a computer program product comprising a computer readable storage medium having program instructions embodied therewith, wherein the program instructions are executable by a processor to cause the processor to perform a method. The method comprises running a plurality of servers to provide computer services to a plurality of client devices and storing a hardware profile for each of a plurality of server models, wherein the hardware profile for each server model identifies a subset of the hardware components of any one of the servers that should be enabled to implement the server model. The method further comprises receiving a request from a client device to provide computer services to the client device on one or more of the servers using a selected one of the server models and applying the hardware profile for the selected server model to configure the hardware components of the one or more of the servers to use the identified subset of the hardware components without manually reconfiguring the hardware components of the one or more of the servers. Still further, the method comprises providing computer services to the client device using the one or more of the servers that has been configured using the hardware profile for the selected server model.

BRIEF DESCRIPTION OF THE SEVERAL VIEWS OF THE DRAWINGS

FIG. 4 is a server configuration table representing a plurality of server models and their associated hardware profiles.

DETAILED DESCRIPTION OF THE INVENTION

Figure 1:
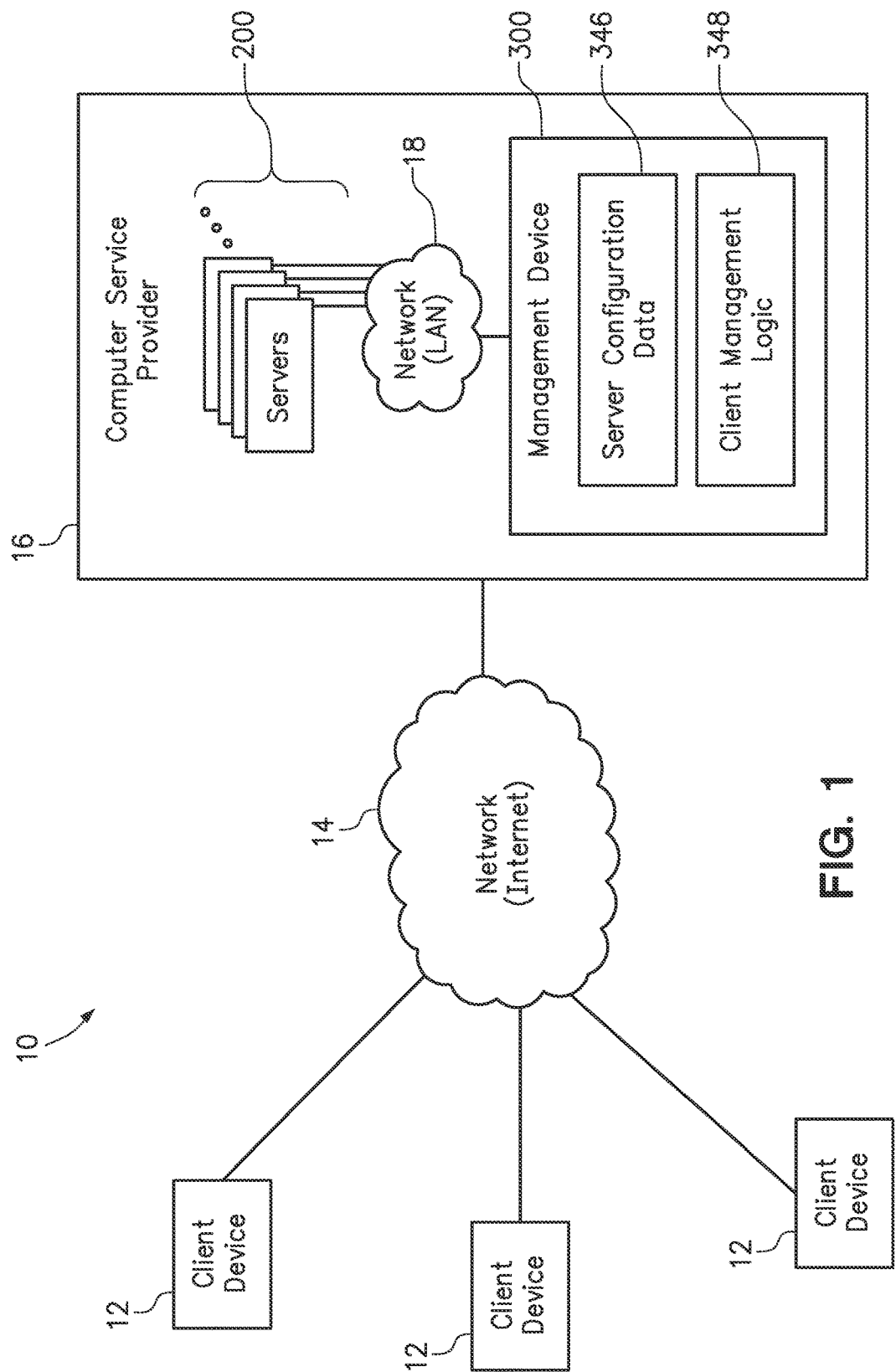
FIG. 1 is a diagram of a system for providing computer services to any of a plurality of client devices.

One embodiment of the present invention provides a method, comprising running a plurality of servers to provide computer services to a plurality of client devices and storing a hardware profile for each of a plurality of server models, wherein the hardware profile for each server model identifies a subset of the hardware components of any one of the servers that should be enabled to implement the server model. The method further comprises receiving a request from a client device to provide computer services to the client device on one or more of the servers using a selected one of the server models and applying the hardware profile for the selected server model to configure the hardware components of the one or more of the servers to use the identified subset of the hardware components without manually reconfiguring the hardware components of the one or more of the servers. Still further, the method comprises providing computer services to the client device using the one or more of the servers that has been configured using the hardware profile for the selected server model.

The plurality of servers may be connected in a network, such as a local area network or a cluster. Optionally, the plurality of servers may each have the same type, quantity and performance of hardware components such that any one of the servers can be configured as any one of the server models.

The hardware profiles may be stored on each of the servers or on a management device that is in communication with the plurality of servers. For example, the client request may be received either by one of the servers or by the management device, such that the management device provides one of the servers with the hardware profile associated with the server model identified in the client request. The selection of one of the servers from among the plurality of servers may be predetermined or based on some criteria, such as availability, existing workload, or the existence of the hardware necessary to satisfy the hardware profile of the selected server model. Furthermore, the client request may be stored as a user preference that is applied whenever the client logs into an account.

The server models may be generic combinations of hardware component types, quantities and performance, and/or the server models may be specific combinations of hardware component types, quantities and performance that mimic actual commercially available server models. The hardware profile for each server model may, for example, identify a type, quantity, and/or performance of processors and memory modules. Optionally, the hardware profile for each server model may further identify a type, quantity, and/or performance of other hardware components, such as a network interface, other input output device or expansion card, or include one or more firmware settings. In one option, a graphical user interface may be provided to allow a user of the client device to identify the selected server model from a list of the plurality of server models.

Consistent with embodiments of the present invention, there are various ways of applying the hardware profile for the selected server model to configure the hardware components of the one or more of the servers to use the identified subset of the hardware components without manually reconfiguring the hardware components of the one or more of the servers. As a first example, a hardware profile may be applied by disabling power to one or more hardware components of the one or more of the servers that are not included in the identified subset of the hardware components. Optionally, the power to the one or more hardware components of the one or more of the servers that are not included in the identified subset of the hardware components may be disabled by a baseboard management controller within the one or more of the servers. In such a case, a hardware component that has been previously disabled may be enabled in response to selecting a different server model for the one or more of the servers. In a second example, a hardware profile may be applied by changing a firmware setting for one or more hardware components of the one or more of the servers that are not included in the identified subset of the hardware components. Non-limiting examples of a firmware element that may receive a firmware setting include a unified extensible firmware interface (UEFI), a baseboard management controller (BMC), an integrated management module (IMM) or a field-programmable gate array (FPGA). Optionally, the firmware setting for the one or more hardware components of the one or more of the servers that are not included in the identified subset of the hardware components is changed by a baseboard management controller within the one or more servers. In a third example, a hardware profile for a server model identifies a processor speed, such that applying the hardware profile for the selected server model includes limiting a processor in the one or more of the servers to the identified processor speed.

Certain hardware profiles may be applied to configure the one or more of the servers without resetting the one or more of the servers, while other hardware profiles may require a reset of the one or more of the servers. For example, applying a hardware profile that requires disabling a CPU or memory module, or a hardware profile that requires enabling a previously disabled CPU or memory module, will typically require a reset of the one or more of the servers since operating systems in the x86 space typically do not support hot plug/replace for CPUs or memory modules. However, if applying a hardware profile only requires enabling or disabling a PCI device, then the hardware profile may be applied without resetting the one or more of the servers.

A BMC may pass hardware settings to a UEFI for handling. For example, a UEFI may be able to disable memory or implement speed changes on the memory or CPU via direct communication with the memory or CPU and without involving a FPGA. However, the UEFI may disable a PCI device by requesting that a FPGA hold the PCI device in reset. Disabling a CPU may involve the BMC. The UEFI typically communicates with the FPGA and BMC over a low pin count (LPC) using a defined command protocol to ensure that all requested changes are applied.

In another embodiment, one or more settings associated with the selected server model are stored in, or accessible to, a baseboard management module of the one or more of the servers and communicated to firmware elements of the selected server. The firmware elements may then prevent one or more of the subset of hardware components from being enabled during the next boot of the one or more of the servers.

In yet another embodiment, the method may further comprise determining that the one or more of the servers could provide the computer services more effectively if the one or more of the servers was reconfigured as a different one of the server models. The client device may then be notified that the different server model could provide the computer services more effectively. Optionally, the notification includes an option for the user of the client device to request that the computer services be provided using the different server model.

In a still further embodiment, the method may further comprise determining that the one or more of the servers could provide the computer services using less power if the one or more of the servers was reconfigured as a different server model. The one or more of the servers may then be automatically reconfigured as the different server model. These steps may be implemented by a management device responsible for managing the plurality of servers in a power efficient manner.

Embodiments of the present invention may implement a system that is standardized on a rich configuration of hardware that is configurable to physically enable, disable and control CPUs, DIMMs, I/O slots, expansion cards, subsystems and its associated componentry like VRDs. Accordingly, a server can "impersonate" different hardware systems having different CPU and memory capabilities. Using a standardized hardware configuration reduces the need to test and validate a variety of server models. Furthermore, homogeneity of servers across one or more datacenters simplifies debugging and the stocking of replacement parts, while enhancing reliability.

Embodiments of the system may also be capable of monitoring CPU, memory and I/O utilization out-of-band through the Baseboard Management Controller (BMC), so that a cloud provider can determine if a server is experiencing high utilization and recommend that the client device upgrade the hardware configuration of the server. Furthermore, a cloud infrastructure hosting provider may offer various models of servers, such as those having various numbers (i.e., 1, 2, 4, or 8) CPUs, with different numbers of cores and speeds, as well as different memory configurations. By physically disabling hardware components that are not in a given server model, a significant amount of power and associated cooling may be saved. The hosting provider may have fill control over the capacity of each server at any point in time, or make control accessible to a client device. Embodiments preferable turn off hardware components that are not in use, or put them in a minimal power state, but maintain a path to allow the hardware components to return to a working state.

Another embodiment of the present invention provides a computer program product comprising a computer readable storage medium having program instructions embodied therewith, wherein the program instructions are executable by a processor to cause the processor to perform a method. The method comprises running a plurality of servers to provide computer services to a plurality of client devices and storing a hardware profile for each of a plurality of server models, wherein the hardware profile for each server model identifies a subset of the hardware components of any one of the servers that should be enabled to implement the server model. The method further comprises receiving a request from a client device to provide computer services to the client device on one or more of the servers using a selected one of the server models and applying the hardware profile for the selected server model to configure the hardware components of the one or more of the servers to use the identified subset of the hardware components without manually reconfiguring the hardware components of the one or more of the servers. Still further, the method comprises providing computer services to the client device using the one or more of the servers that has been configured using the hardware profile for the selected server model.

The foregoing computer program product may further include computer program instructions for implementing or initiating any one or more aspects of the methods described herein. Accordingly, a separate description of the methods will not be duplicated in the context of a computer program product.

FIG. 1 is a diagram of a system 10 for providing computer services to any of a plurality of client devices 12. The client devices 12 communicate over a network 14 in order to access a computer service provider 16. For example, the network 14 may be a global communications network, such as the Internet, and the computer service provider may be web service, such as a cloud service provider.

The computer service provider 16 includes a plurality of servers 200 that are used to provide services to the client devices 12. One or more of the servers 200 may be a standalone server that provides a service on its own and/or the servers 200 may be in communication over a local area network (LAN) 18 or form a cluster. The computer service provider 16 further includes a management device 300, such as a server, that may communicate with the servers 200 and the client devices 12. The management device 300 includes server configuration data 346 that is used to configure any one or more of the servers 200 according to a selected server model. The management device 300 further includes client management logic 348 that is used to manage the provision of computer services by the one or more servers to a specific client device 12.

Figure 2:
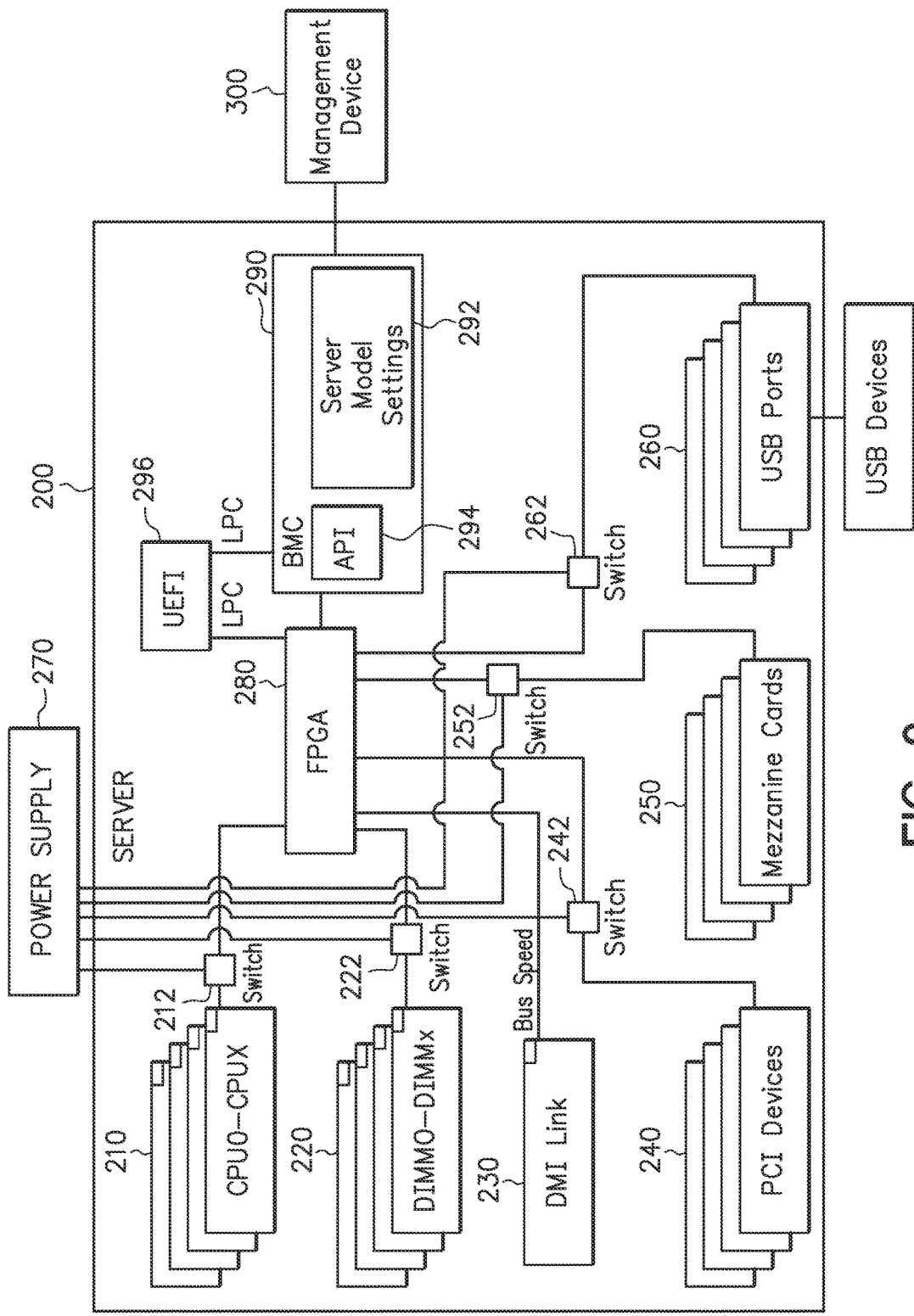
FIG. 2 is a block diagram of a server in accordance with one embodiment of the present invention.

FIG. 2 is a block diagram of a server 200 in accordance with one embodiment of the present invention. Many of the hardware devices that would be present in server 200 have been omitted from FIG. 2 in order to highlight operation of the present invention.

The server 200 includes various hardware devices, including one or more CPUs 210, one or more DIMM 220, one or more DMI link 230, one or more PCI devices 240, one or more mezzanine cards 250, and one or more USB ports 260.

A power supply 270 provides power to each of the hardware devices in the server 200, but whether certain hardware devices receive power at a given point in time depends upon the condition of a switch. For example, each of the CPUs may be coupled to the power supply 270 through its own switch 212. Accordingly, a server with four CPUs 210 would have four switches 212 (only one shown in FIG. 2). Each of those four switches 212 would be independently controllable by a field-programmable gate array (FPGA) 280 to allow any one or more of the CPUs to be powered off without necessarily also powering off the other CPUs. The FPGA 280 may control other switches in the server 200 in order to provide similar control over other hardware devices. Specifically, as shown in FIG. 2, the FPGA 280 communicates with one or more switches 222 to independently control power to one or more DIMM 220, one or more switches 242 controlling power to one or more PCI devices 240, one or more switches 252 controlling power to one or more mezzanine cards 250, and one or more switches 262 controlling power to one or more USB ports 260. The FPGA 280 may also control other aspects of the hardware devices, such as controlling the bus speed of the DMI link 230. It should be apparent to those having ordinary skill in the art that other hardware devices may be controlled in the same or similar manner as just described. In particular, subsystems embedded on a motherboard, such as the on-board serial attached SCSI (SAS) subsystem, may be placed in a very low power state when disabled.

In the embodiment shown, the management device 300 provides server model settings 292 to a baseboard management controller (BMC) 290 of one of the servers 200. The BMC 290 may use an application programming interface (API) 294 in order to communicate the hardware configuration directly to the FPGA 280, perhaps over an inter-integrated circuit (I2C) bus, or the BMC may communicate the hardware configuration to the UEFI 296. The UEFI 296 may then implement the hardware configuration, for example, by communicating instructions to the FPGA 280. The FPGA 280 then implements at least one aspect of the hardware configuration, preferably without requiring that the server 200 be powered off. Optionally, the server model settings (i.e., hardware profile for a selected server model) may be stored in memory that is separate from, but accessible to, the BMC 290. The memory, whether internal or external to the BMC 290, is preferably a nonvolatile memory such as SEEPROM, NVRAM, or flash.

The server model settings for any given server model may result in various actions depending upon which hardware components, if any, are being disabled. The server model settings are pushed down to the baseboard management controller (BMC), but the task of taking or keeping a hardware component offline may be handled by one or more of a unified extensible firmware interface (UEFI), a field-programmable gate array (FPGA), or the BMC itself. For example, disabling a CPU may involve the BMC driving a PROCHOT# (Processor Hot) signal to the CPU during reset such that the CPU does not come out of its initialization state. In another example, the BMC may allow the UEFI to select a method for disabling a PCI device. The UEFI may, without limitation, either send a request to a FPGA to drive a PCI reset signal to the PCI device or communicate with a PCI device driver to disable one or more ports in the PCI device. In yet another example, a memory module (i.e., a DIMM) behind the CPU may be disabled either by causing a FPGA to power off the CPU segment associated with the memory module, or the UEFI can cause the memory initialization code to skip initializing of the one or more memory module slots that should not be used.

Figure 3:
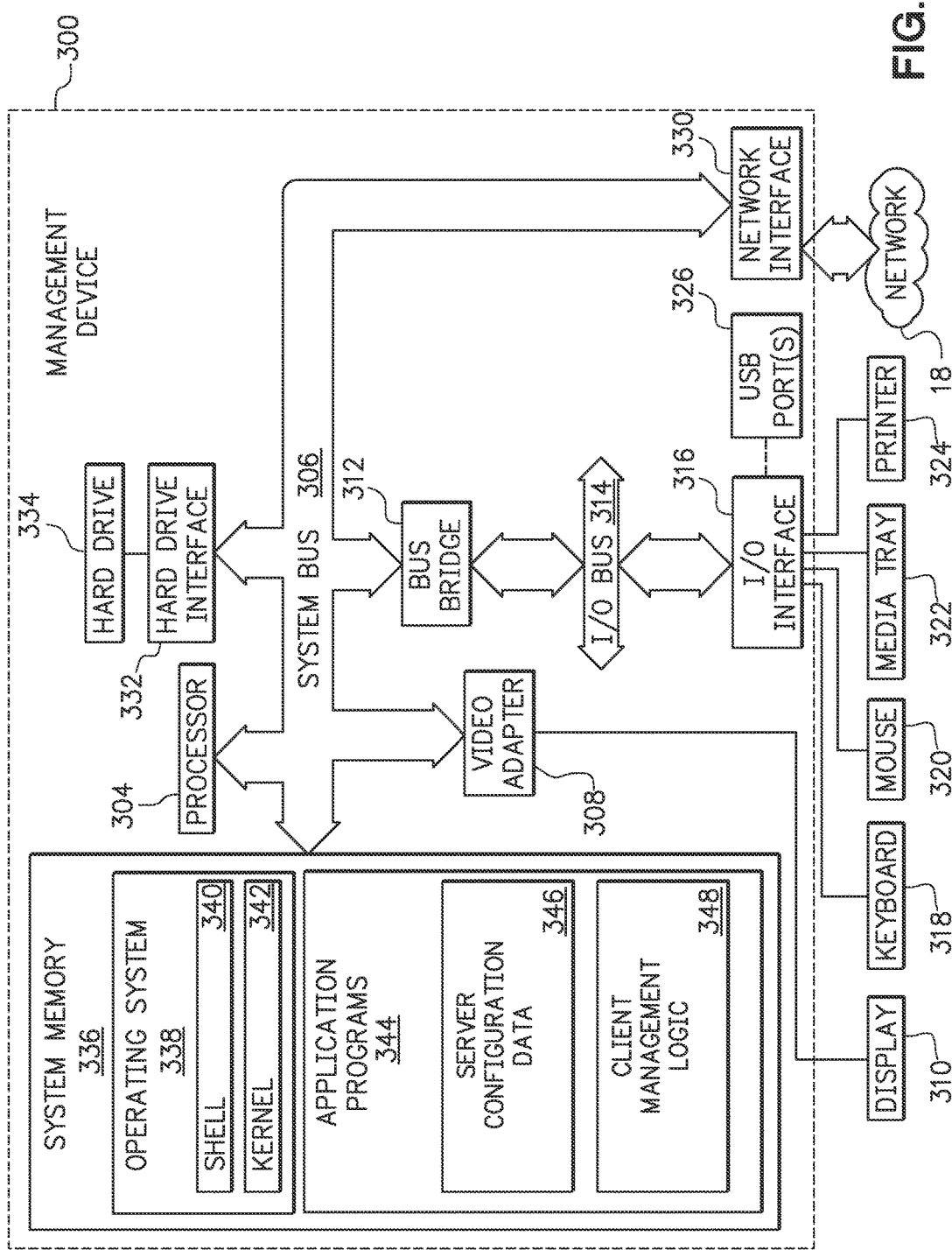
FIG. 3 is a diagram of a management device.

FIG. 3 is a diagram of a management device 300. The management device 300 includes a processor unit 304 that is coupled to a system bus 306. The processor unit 304 may utilize one or more processors, each of which has one or more processor cores. A video adapter 308, which drives/supports a display 310, is also coupled to system bus 306. The system bus 306 is coupled via a bus bridge 312 to an input/output (I/O) bus 314. An I/O interface 316 is coupled to I/O bus 314. The I/O interface 316 affords communication with various I/O devices, including a keyboard 318, a mouse 320, a media tray 322 (which may include storage devices such as CD-ROM drives, multi-media interfaces, etc.), a printer 324, and USB port(s) 326.

As depicted, the management device 300 is able to communicate with other servers (i.e., servers 200 shown in FIGS. 1 and 2) and client devices via a network 18 using a network interface 330. The network 18 may be an internal network such as a local area network, which may also communicate with an external network (i.e., network 14 shown in FIG. 1).

A hard drive interface 332 is also coupled to the system bus 306. The hard drive interface 332 interfaces with a hard drive 334. In a preferred embodiment, the hard drive 334 communicates with system memory 336, which is also coupled to the system bus 306. System memory is defined as a lowest level of volatile memory in the management device 300. This volatile memory includes additional higher levels of volatile memory (not shown), including, but not limited to, cache memory, registers and buffers. Data that populates the system memory 336 includes the operating system (OS) 338 and application programs 344.

The operating system 338 includes a shell 340 for providing transparent user access to resources such as application programs 344. Generally, the shell 340 is a program that provides an interpreter and an interface between the user and the operating system. More specifically, the shell 340 executes commands that are entered into a command line user interface or from a file. Thus, the shell 340, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while the shell 340 is a text-based, line-oriented user interface, the present invention will equally well support other user interface modes, such as graphical, voice, gestural, etc.

As depicted, the operating system 338 also includes the kernel 342, which includes lower levels of functionality for the operating system 338, including providing essential services required by other parts of the operating system 338 and application programs 344, including memory management, process and task management, disk management, and mouse and keyboard management. The application programs 344 in the system memory of the management device 300 may include the server configuration data 346 and the client management logic 348.

The hardware elements depicted in the management device 300 are not intended to be exhaustive, but rather are representative. For instance, the management device 300 may include alternate memory storage devices such as magnetic cassettes, digital versatile disks (DVDs), Bernoulli cartridges, and the like. These and other variations are intended to be within the scope of the present invention.

Furthermore, the servers 200 may include a hardware configuration similar to that of the management device 300.

FIG. 4 is a table of server configuration data 346 representing a plurality of server models and their associated hardware profiles. The table includes a first column including a list of server models A-D. It should be recognized that the server models may be generic combinations of hardware components or specific combinations of hardware components associated with commercially available server models. A second column of the table identifies the types, quantities and performances of each hardware component associated with a given one of the server models. For example, if the server has 4 CPUs and 8 DIMMs, but the hardware profile of a selected server model only includes 2 CPUs and 4 DIMMs then the remaining CPUs and DIMMs will be disabled. A third column of the table identifies firmware code that is needed to apply a particular configuration to a given server.

If firmware code detects that an update was pushed down, then the firmware code determines whether the update is specific to one or more hardware components that are disabled. If so, then the firmware code selectively enables the disabled hardware components to apply the firmware update so that the firmware update is enabled by the user while switching to a different server model.

Figure 5:
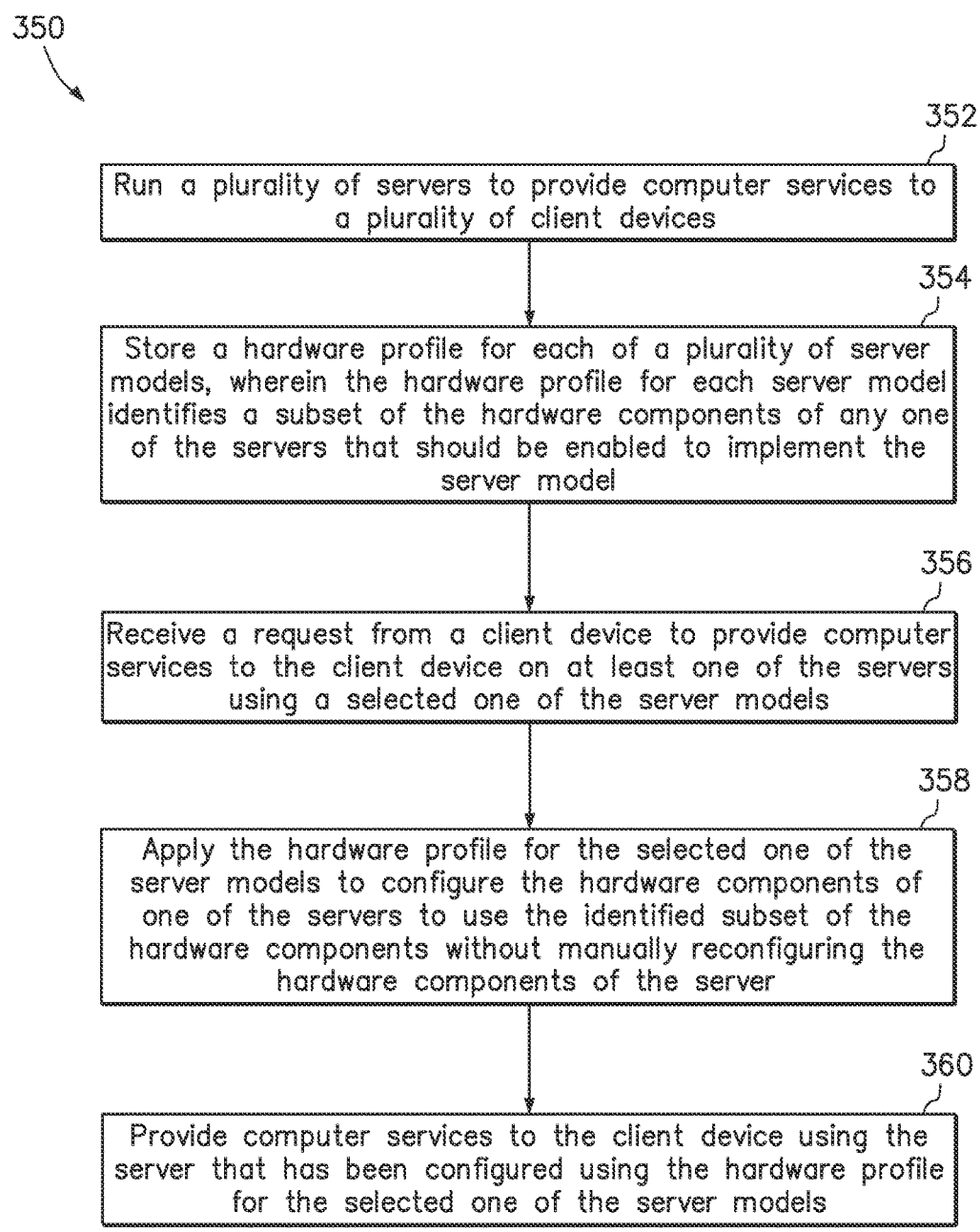
FIG. 5 is a flowchart of a method of providing computer services to a client device.

FIG. 5 is a flowchart of a method 350 of providing computer services to a client device. Such a method may be embodied in the client management logic 348 shown in FIGS. 1 and 3. In step 352, the method runs a plurality of servers to provide computer services to a plurality of client devices. In step 354, the method stores a hardware profile for each of a plurality of server models, wherein the hardware profile for each server model identifies a subset of the hardware components of any one of the servers that should be enabled to implement the server model. In step 356, the method receives a request from a client device to provide computer services to the client device on one or more of the servers using a selected one of the server models. The hardware profile for the selected server model is applied in step 358 in order to configure the hardware components of the one or more of the servers to use the identified subset of the hardware components without manually reconfiguring the hardware components of the one or more of the servers. Then, in step 360, the method provides computer services to the client device using the one or more of the servers that have been configured using the hardware profile for the selected server model.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing, in the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer server, comprising:
   a plurality of in-band hardware components including a plurality of central processing units and a plurality of memory modules, each central processing unit operatively coupled to a separate switch for providing or disabling power to the central processing unit, and each memory module operatively coupled to a separate switch for providing or disabling power to the memory module;

a storage device for storing program instructions;

an out-of-band service processor; and a field-programmable gate array in communication with the service processor and each of the switches; the out-of-band service processor for processing the program instructions to:

receive an instruction to configure the computer server according to a selected hardware profile among a plurality of stored hardware profiles, wherein each of the plurality of stored hardware profile identifies a subset of the hardware components of the computer server to be enabled;

instruct the field-programmable gate array to control, for each of the hardware components included in the identified subset of the hardware components that is identified by the selected hardware profile, a condition of a switch to provide power from a power supply to a corresponding hardware component; and instruct the field-programmable gate array to control, for each of the hardware components that is not included in the identified subset of the hardware components, a condition of a switch to disable power from the power supply to a corresponding hardware component; and then receive a further instruction to configure the computer server according to a further selected hardware profile among a plurality of stored hardware profiles, wherein the further selected hardware profile identifies a different subset of the hardware components; and in response to receiving the further instruction, control at least one of the switches to disable power to a hardware component, wherein the switch previously provided power to the hardware component.

2. The computer server of claim 1, wherein the service processor is a baseboard management controller.

3. The computer server of claim 1, the out-of-band service processor for further processing the program instructions to:
change a firmware setting for one or more of the hardware components that are included in the identified subset of the hardware components.

4. The computer server of claim 1, wherein the identified subset of hardware components identifies a number of processors and a number memory modules.

5. The computer server of claim 1, wherein the identified subset of hardware components identifies one or more expansion cards.

6. The computer server of claim 1, wherein the identified subset of hardware components identifies one or more input output device.

7. The computer server of claim 1, wherein the instruction to configure the computer server according to a selected hardware profile includes an instruction to limit a central processing unit within the identified subset of hardware components to an identified processor speed, the out-of-band service processor for further processing the program instructions to:
limit the central processing unit to the identified processor speed.

8. The computer server of claim 1, the out-of-band service processor for further processing the program instructions to:
receive a further instruction to configure the computer server according to a further selected hardware profile among a plurality of stored hardware profiles, wherein the further selected hardware profile identifies a different subset of the hardware components of the computer server to be enabled; and
in response to receiving the further instruction, control at least one of the switches to provide power to a hardware component, wherein the switch previously disabled power to the hardware component.

9. The computer server of claim 1, wherein the plurality of stored hardware profiles are stored on a management device that is in communication with the computer server.

10. The computer server of claim 1, wherein the plurality of stored hardware profiles are stored on the computer server in data storage accessible to the service processor.

* * * * *